United States Patent [19]
Valle

[11] 3,967,164
[45] June 29, 1976

[54] SERVICE ACCESS CONTROL PANEL HAVING ELECTRICAL COMPONENT ARRAY, INTERLOCK SWITCH AND FUSE BLOCK

[75] Inventor: Michael A. Valle, Oxford, Miss.

[73] Assignee: Chambers Corporation, Cleburne, Tex.

[22] Filed: May 10, 1974

[21] Appl. No.: 468,897

[52] U.S. Cl. .............................. 317/114; 174/52 R; 200/61.62; 200/61.74; 312/323
[51] Int. Cl.² ...................... H02B 1/04; H01H 3/16; F24C 7/08
[58] Field of Search .............. 174/52 R; 200/50 AA, 200/61.43, 61.62, 61.71–61.75; 317/99, 101 R, 116, 117, 119, 120, 114; 312/133, 322, 323

[56] References Cited
UNITED STATES PATENTS

| 913,669 | 2/1909 | Munsell | 200/61.74 |
|---|---|---|---|
| 2,453,832 | 11/1948 | Dadson | 174/52 R |
| 2,486,764 | 11/1949 | Singer | 312/323 UX |
| 2,510,681 | 6/1950 | Campbell et al. | 174/52 R |
| 2,566,064 | 8/1951 | Keim | 174/52 R UX |
| 2,598,266 | 5/1952 | Kamin et al. | 312/323 UX |
| 2,612,590 | 9/1952 | Lachowicz | 317/99 |
| 2,789,024 | 4/1957 | Heisler | 174/52 R |
| 2,856,450 | 10/1958 | Padgett et al. | 174/52 R |
| 3,088,054 | 4/1963 | Meyer | 317/99 X |
| 3,133,768 | 5/1964 | Klakovich | 312/323 X |
| 3,479,567 | 11/1969 | Glassman | 317/116 X |

Primary Examiner—James R. Scott
Attorney, Agent, or Firm—Richards, Harris and Medlock

[57] ABSTRACT

A control panel for an electric oven providing easy access to service the components on the rear of the panel. The panel has a component shelf supported from the rear thereof and a pair of slides which permit the panel to be pulled forward and away from a flush mounted position on the appliance. A pivot is provided on the ends of the slides for permitting the panel to pivot about a horizontal axis once a pivot lock is released. A power interrupter is associated with the panel to disconnect the supply of power to the panel once the panel is moved from its normal position. In addition, an integrally mounted fuse block is positioned on the upper portion of the oven and interconnected to the panel to insure proper fusing for the oven.

8 Claims, 4 Drawing Figures

SERVICE ACCESS CONTROL PANEL HAVING ELECTRICAL COMPONENT ARRAY, INTERLOCK SWITCH AND FUSE BLOCK

BACKGROUND OF THE INVENTION

The present invention relates to improvements in control panels for electrical appliances. Another aspect of this invention relates to a new and improved control panel structure providing easy access to the components thereof for the purpose of servicing. A further aspect of the present invention relates to an improved control panel for an electrical appliance which is safe to service. An even further aspect of the present invention relates to an improved control panel which insures proper fusing.

In the design of appliances, such as electrical ovens, it has been a common practice to provide a control panel on the oven having the various control switches, indicators, and timing devices mounted thereon. In addition, circuitry associated with these components for controlling the operation of these ovens is conventionally mounted behind the control panel on a chassis. Access to and servicing of these components is conventionally accomplished by removing the control panel or the complete oven to expose the components mounted therebehind. In some instances, due to the size and weight of the oven such as a double oven, two individuals are required to remove the oven for the purpose of servicing.

Although these conventional ovens served their purpose, a need to improve the oven from the standpoint of serviceability exists. In addition, due to increased costs for labor involved in servicing ovens, an oven which can be quickly and efficiently serviced has become highly desirable.

The components in the control circuitry of an electrical oven carry currents which are of a dangerous magnitude. Thus, it is desirable to provide a control panel which is safe to service and minimizes the danger to an individual during servicing. In some situations, ovens are incorrectly installed. At times, this incorrect installation involves the improper fusing of an oven, creating a dangerous situation. Therefore, it is desirable to provide an oven which eliminates this danger.

According to one embodiment of the invention, an improved oven has a control panel which slides horizontally away from the oven and which rotates about a horizontal axis to provide access to the components therebehind.

The present invention also contemplates the use of an interrupter switch to automatically remove power from the panel when the panel is moved to the service position.

The present invention further provides an integrally mounted fuse block on the unit which is wired in series with the controls of the unit and which insures proper fusing.

More particularly, the present invention provides a control panel for an electric oven or range mounted on slides allowing the panel to slide away from a flush-mounted position. Slide limits are provided to limit the travel of the panel in a horizontal direction. Pivots are provided on the slides to allow the panel to rotate about a horizontal axis and component shelves are provided on the rear of the panel to carry the components associated with the panel to provide easy access to these components. A position-sensing switch is mounted at the rear of the oven and senses movement of the panel from the closed position to disconnect power from the panel when the panel is moved to the service position. An integral fuse box is provided on the oven to insure proper fusing of the unit.

The advantages of the present invention will be readily appreciated by those of ordinary skill in the art as the same becomes better understood by reference to the following detailed description when considered in connection with the accompanying drawings in which:

DESCRIPTION OF THE PREFERRED EMBODIMENT

Figure 1:
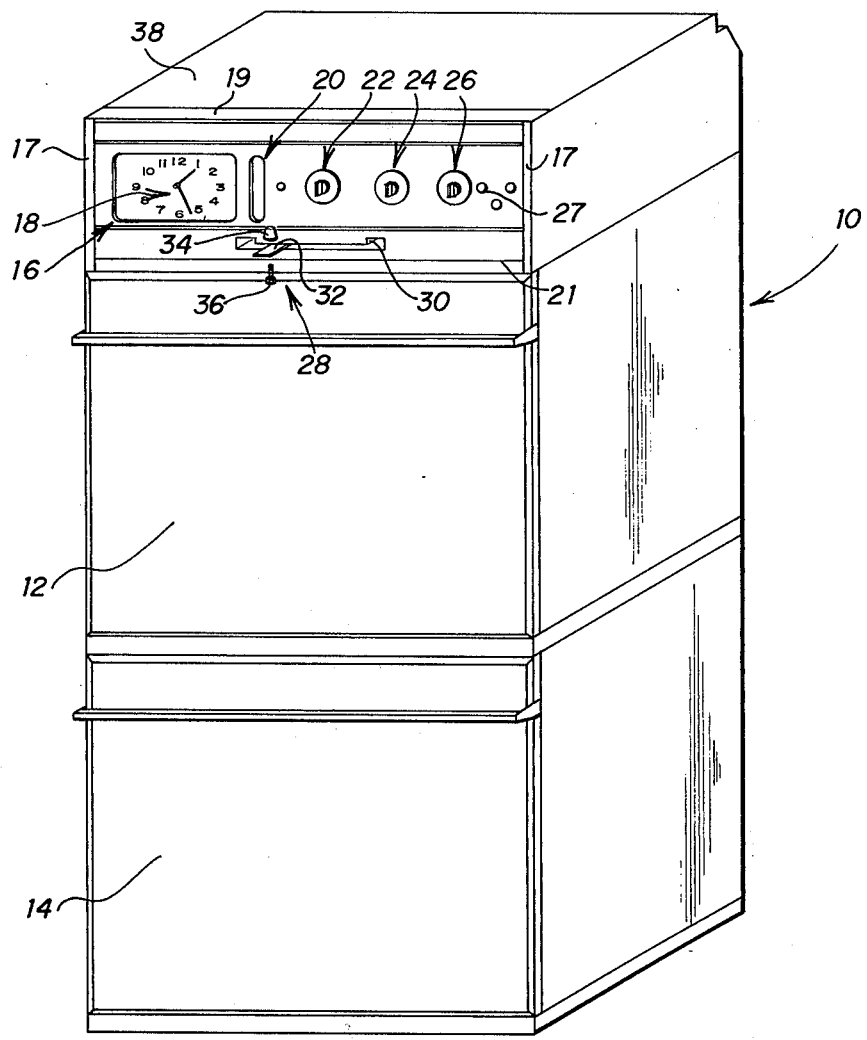
FIG. 1 illustrates a front perspective view of the improved control panel of the present invention for use on a double oven.

Referring now to the drawings, wherein like reference characters designate like or corresponding parts throughout the several views, there is shown in FIG. 1, a double oven module assembly 10. In the present embodiment, assembly 10 has upper and lower ovens 12 and 14, respectively, having front opening doors and electrical heating elements. An improved control panel 16 of the present invention is positioned above and connected to the ovens 12 and 14. It is to be understood, of course, that the position of the control panel with respect to the ovens 12 and 14 can vary and is shown above the ovens for illustration only. Also, although control panel 16 is shown with a double oven assembly, it is to be understood, of course, that it could be used with a single oven assembly or with other types of electrical appliances requiring service access to components behind a control panel.

The panel 16 is framed with a top 19, a bottom 21, and end caps 17. The module assembly 10 is conventionally mounted in a cavity of a size to receive the assembly 10 with the front surface of the ovens 12 and 14, and control panel 16 flush with the front of the cavity.

A combination timer and clock unit 18 is mounted on the left-hand side of the panel 16. The clock 18 is connected to the oven 12 and can automatically time the operation thereof. A meat probe temperature indicator and switch 20 is mounted on the right-hand side and adjacent to the clock 18.

Spaced across the right-hand side of the panel 16 are lower oven temperature control 22, oven selector control 24, upper oven temperature control 26, and switches 27. These switches and controls are connected to the ovens and provide for operation thereof. An oven cleaning control 28 is centrally located in panel 16. This control 28 has an arm 32 which extends through an elongated horizontal slot 30. A handle 34 is attached to the extending end of arm 32 by means of fastener 36.

Each of the various components mounted and illustrated on the front of the panel 16 has terminals and connections on the rear side of the panel. This rear area of the panel is covered by a housing 38.

Figure 2:
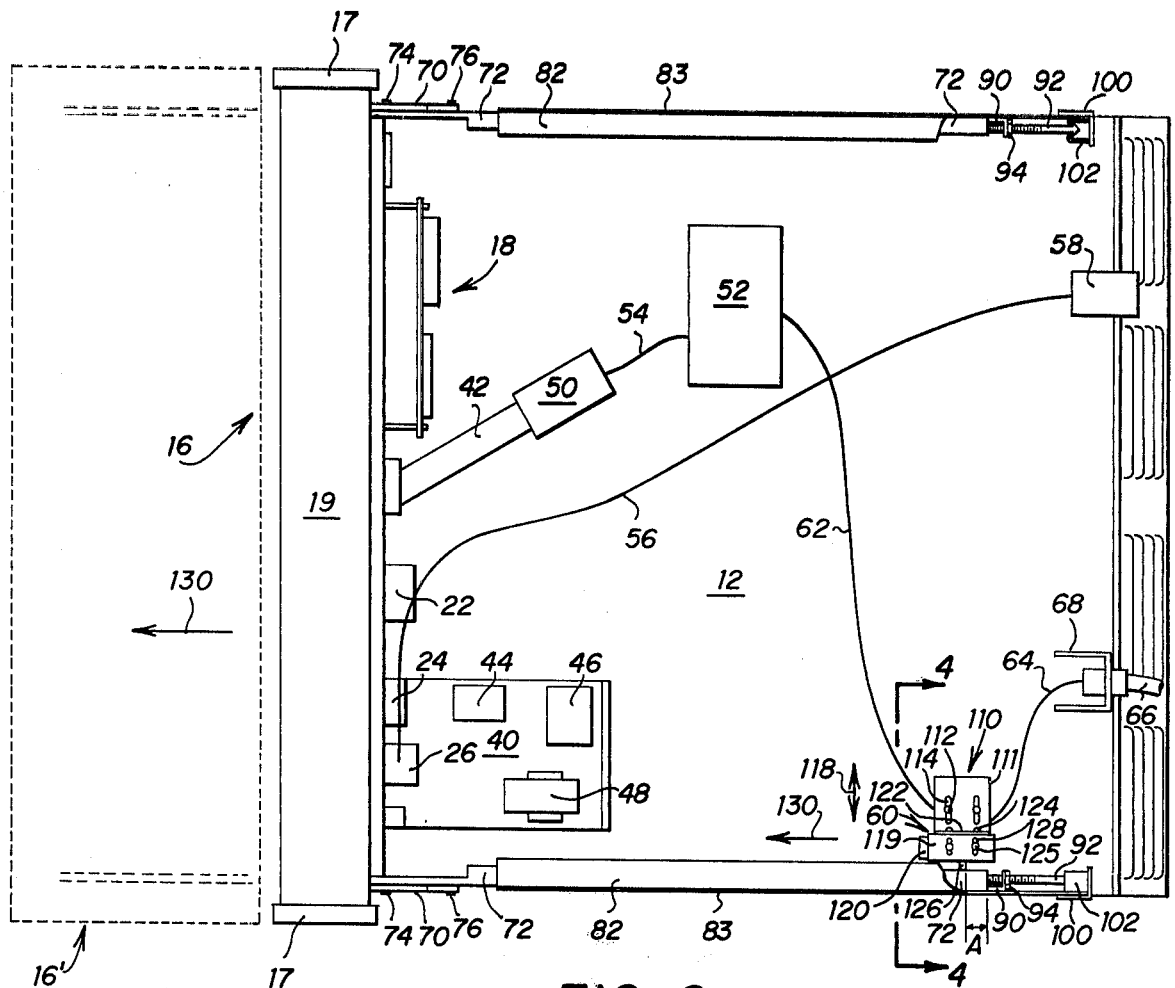
FIG. 2 illustrates an enlarged plan view of the device with the cover removed.
Figure 3:
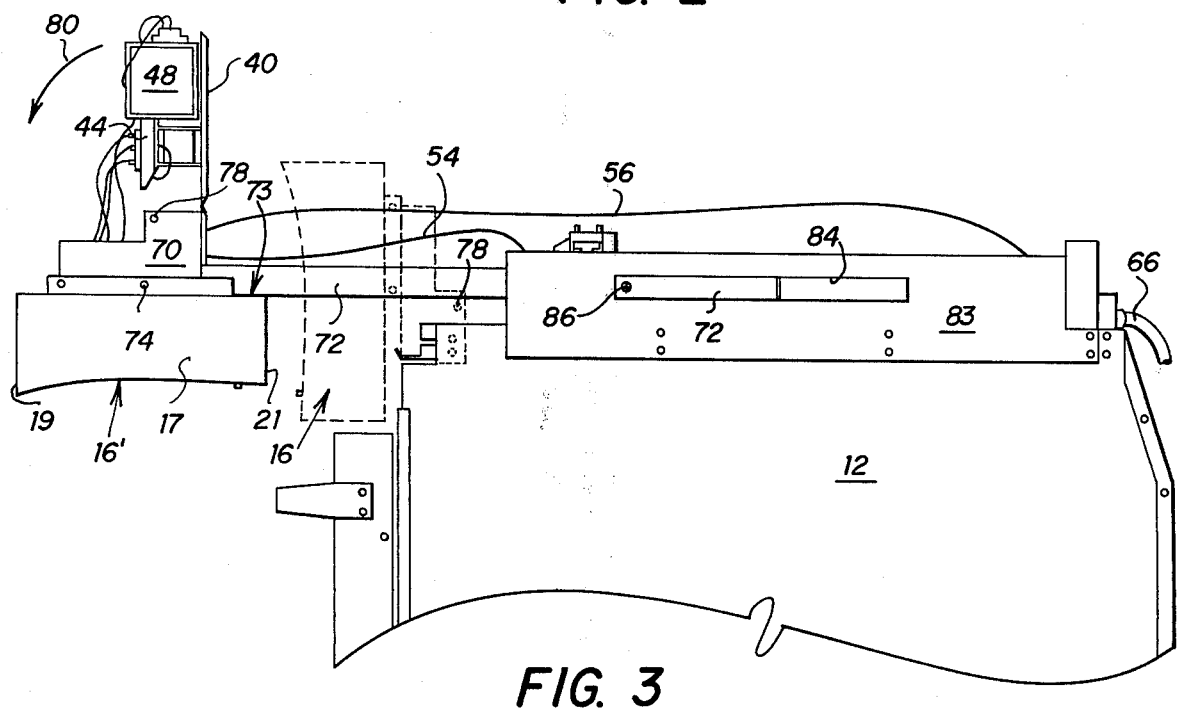
FIG. 3 is a right side elevation view of the device in the service position and with the cover removed.

As illustrated in FIGS. 2 and 3, component shelves 40 and 42 are mounted on the rear of panel 16 and extend horizontally and to the rear thereof. In the embodiment illustrated, the component shelves are two separate members but it is to be understood, of course, that more shelves could be provided as required by each particular application. The component shelf 40 is positioned below and to the rear of the controls 22, 24 and 26 and can support components such as a ballast 44, a relay 46, and a transformer 48. These components are interconnected with the panel in a conventional manner.

The shelf 42 supports a terminal block 50 used for interconnecting the panel 16 and components to a fuse block 52. Fuse block 52 is mounted on the upper surface of the oven 12 and has proper fuses for the oven. For purposes of description, this interconnection is shown as a cable 54 extending between the fuse block 52 and the terminal block 50. Cable 54 is selected to have sufficient length to allow movement of the control panel as will be hereinafter described in detail. In addition, a thermostat cable 56 is connected to the rear of components on panel 16 and extends through a channel member 58 to a thermostat monitoring oven temperature. This cable 56, like cable 54, has a sufficient length to allow the hereinafter described movement of front panel 16.

Power is supplied through cable 62 to fuse 52 from interlock switch assembly 60. Switch assembly 60 is operated by the movement of the panel 16 and power is supplied to switch assembly 60 from the house wiring through cable 64. Cable 64 is connected to a pigtail 66, supported by a channel 68 mounted on the upper surface of the oven 12.

According to a particular feature of the present invention, the control panel 16 is provided with means for allowing the panel to be pulled out and rotated to a service position. The normal position is illustrated in FIG. 3 in dotted lines, and identified by reference numeral 16. The service position is illustrated in FIG. 3 in solid line and identified as 16'.

The particular structure for providing rotation of panel 16 has a pair of pivot plates 70 attached to the rear of panel 16. The plates 70 extend perpendicular to the panel 16, and are attached to slides 72 at pivots 74. Pivots 74 allow the panel 16 to rotate about the horizontally extending axis extending through pivots 74. Rotation lock screws 76 extend through clearance openings 78 in plates 70 and are threaded into the slide 72 to prevent relative rotation between the slide 72 and the panel 16 when lock screws 76 are in place. Removal of lock screws 76 provides free rotation in the direction of arrow 80 of panel 16 with respect to slide 72. The rotation of the panel 16 is limited to 90° by contact between the rear face of panel 16 with the lower surface of the slide 72 at line 73 as illustrated in FIG. 3.

The slides 72 each comprise an interior facing elongated channel extending horizontally across the top of the oven. The slides 72 are mounted in sliding engagement within the flanges of slide channels 82. The flanges of channels 82 form tracks for slides 72. Slide channels 82 are attached to side plates 83 and extend across the top of oven 12 in a spaced parallel relationship. Each of the slide channels 82 and plates 83 has a longitudinally extending slot 84 therein. Slide limit screws 86 are attached to each of the slides 72 and will engage the ends of the slots 84 on movement of the panel 16. These screws 86 limit the horizontal movement of slides 72 with respect to slide channels 82. These slide limit screws 86 can be removed to allow complete removal of the slide 72 from the channel 82.

Angle members 90 are mounted on the rear end of each slide 72 and support a latch strike 92. Latch strike 92 is threaded and provided with suitable nuts 94 for adjusting the length of extension of latch strike 92 to the rear of the slides 72. A pair of angle members 100 are mounted on the upper surface of oven 12 and support latches 102. These latches 102 are positioned to engage and frictionally retain the latch strikes 92 in the normal closed position. The force of these latches 102 can be overcome by pulling outward on the panel 16.

Figure 4:
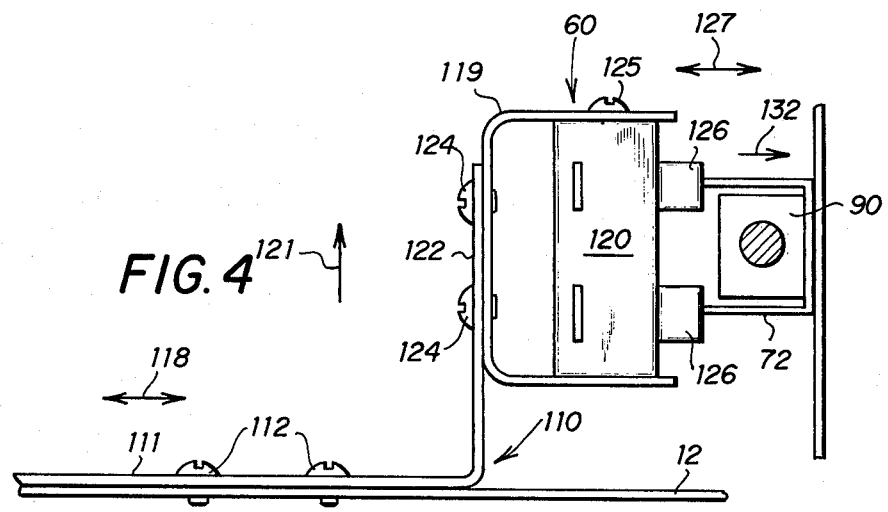
FIG. 4 is a section of the device taken on lines 4—4 of FIG. 2, looking in the direction of the arrows.

The interlock switch assembly 60 is illustrated in detail in FIGS. 2 and 4 as being supported from an angle member 110 with one flange 111 mounted on the upper surface of the oven 12. Fasteners 112 engage and extend through slots 114 in flange 111. These slots 114 allow adjustments of the position of the angle member 110, and the switch assembly 60 in the direction of arrows 118. A channel member 119 is attached to flange 122 of angle member 110 by means of fasteners 124 mounted in slots (not shown) in flanges 122 to allow the adjustment of the position of the switch in the direction of arrows 121.

A switch 120 is attached to the flanges of channel member 119 by means of fasteners 125 and is supported at a height corresponding to the height of the slide 72. These fasteners 124 are positioned in slots 128 in channel member 119 to allow adjustment of the position of switch 120 in the direction of arrows 127.

The switch 120 has actuators 126 extending in a direction towards the slide 72. The flanges of the slide 72 normally engage and depress the actuators 126 when the panel 16 is in the closed position. This position is illustrated in FIGS. 2 and 4. In this position, the internal contacts of switch 120 are closed, and thus provide power from the pigtail 66 to the fuse block 52.

If the panel 16 and slides 72 are moved in the direction of arrow 130, the rear end of the slide 72 will pass the switch actuators 126 and will allow the actuators to move in the direction of arrow 132. In this position, the switch contacts are opened and the supply of power from the pigtail 66 to the fuse block 52 and panel 16 is interrupted.

The dimension "A" shown in FIG. 2 represents the distance slides 72 must be moved before power to the panel 16 is interrupted. In the preferred embodiment, distance "A" is selected to be one-quarter (0.25) of an inch. The slots in flange 122 allow selection of the dimension "A" as desired.

In operation, the improved panel of the present invention can be serviced as follows: First, the fastener 36 and handle 34 are removed to allow arm 32 to slide through the slot 30 when the panel 16 is pulled outward. Next, the end caps 17 are grasped and panel 16 is pulled in the direction of arrow 130 (FIG. 2) to overcome the retaining force of the latches 102 and to move the panel to the service position. Lock screws 76 are removed and the panel is pivoted in the direction of arrow 80 to the position shown as 16' (FIGS. 2 and 3). Upon movement of the panel in the direction of arrow 130, slide 72 will move past the actuators 126, opening the switch 120 and disconnecting power to the panel 16. Movement of the panel in the direction of arrow 130 is limited by engagement of limit screws 86 with the forward end of slots 84. Rotation of the panel in the direction of arrow 80 is limited by the engagement of slides 72 with the rear of the panel.

This simple procedure for gaining access to the rear of the panel 16 and the provision of the various components on component shelves 40 and 42 located on the rear of the panel 16 provides for improved access and serviceability of the unit. In the service position, the internal wiring and components are easy to reach. In addition, this improved panel eliminates the necessity of removing the unit before servicing. By mounting the fuses on the oven in service with house power and the panel, proper fusing of the unit and reduction of hazards is insured. The provision of the interlock switch 120 prevents injury to individuals servicing the unit.

It is to be understood, of course, that the foregoing disclosure relates only to the preferred embodiment of the present invention and that numerous alterations can be utilized to practice the present invention without departing from the spirit and scope of the invention as defined in the appended claims.

I claim:

1. A control panel for an oven comprising in combination:
   a rectangular panel supported from said oven housing in a position flush with the front of said oven;
   controls mounted on and extending through said panel for operating said oven from the front thereof, electrical components wired to said controls and mounted on the rear of said panel;
   a pivot plate attached adjacent each side edge of said panel, said plates mounted to extend in a vertical direction;
   a slide member pivotally attached to each of said pivot plates;
   means on said plate and slide for selectively preventing rotation between said panel and said slides;
   channel members mounted on the sides of the oven forming horizontally extending tracks for each of said slides to allow movement of said panel from a normal position to a service position;
   means on said slides and said channel members for limiting horizontal movement of said panel;
   conductor means electrically connecting said controls and components on said panel to said oven, said conductor means having sufficient length to permit movement of said panel; and
   power control means for disconnecting power to said controls and components when said panel is horizontally moved, said power control means comprising a switch mounted to selectively engage and be operated by the movement of said slide members.

2. An oven comprising in combination:
   a housing defining a pair of vertically spaced chambers, heating elements in each of said chambers, oven doors on said housing for providing access to each of said chambers;
   a rectangular control panel having front and rear sides, control elements for said heating elements, said controls extending through said panel whereby said controls may be manipulated from the front side of said panel;
   electrical components mounted on the rear side of said panel;
   a shelf on the rear side of said panel supporting electrical components;
   wiring electrically connecting said components and controls, said wiring being located on the rear side of said panel;
   pivot plates fixed to the rear side of said panel adjacent each edge of said panel;
   a slide member pivotally attached to each of said pivot plates, a removable fastener means extending through said pivot plate and said slide member for preventing rotation between said panel and said slides when said fastener is in place;
   channel members supported in a spaced parallel relationship from the top of said oven housing, said channel members forming horizontally extending tracks of a size to receive each of said slides therein to allow movement of said panel from a normal position wherein said panel is flush with the front of said oven, and a servicing position wherein said panel is spaced away from said oven a sufficient distance to allow rotation of said panel about said pivot means whereby access to the rear of said panel can be obtained;
   a fuse block mounted on the top of said oven housing;
   a flexible power conductor means electrically connecting said fuse block and the components and controls on said control panel;
   a horizontally extending slot formed in each of said channel members, a removable means extending from said slides and into said slot whereby horizontal movement of said slide is limited by the length of said slot when said removable means is installed on said slide;
   switch means mounted on the upper portion of said oven and positioned adjacent to the rear end of one of said channel members;
   conductor means connecting said switch means to said fuse block, conductor means connecting said switch means to a power supply;
   operator arms on said switch means for selectively engaging said slide and for interrupting the power to said fuse block when said slide is moved from said normal position to said servicing position whereby power is removed from said panel when said panel is in said servicing position; and
   a pair of latch strike members adjustably connected to the rear ends of said slide, a pair of latch elements for releasably engaging said strikes connected to the upper surface of said oven housing in position to receive said latch strike therein and retain said latch strike therein when said panel is in said normal position.

3. An oven comprising in combination:
   a housing defining a chamber, heating elements in said chamber, an oven door on said housing for providing access to said chamber;
   a rectangular control panel having front and rear sides;
   control elements for said oven extending through said panel whereby said controls may be manipulated from said front side of said panel;
   electrical components mounted on the rear side of said panel;
   wiring electrically connecting said components and controls, said wiring being located on the rear of said panel;
   pivot plates fixed to the rear side of said panel adjacent each edge of said panel;
   a slide member pivotally attached to each of said pivot plates;
   a removable fastener means extending through said pivot plate in said slide member for preventing rotation between said panel and said slides when said fastener is in place;

channel members supported in a spaced relationship from said oven housing, said channel members forming horizontally extending tracks of a size to receive each of said slides therein to allow movement of said channel from a normal position wherein said panel is flush with the front of said oven and a servicing position wherein said panel is spaced away from said oven a sufficient distance to allow rotation of said panel about said pivot means whereby access to the rear of said panel can be obtained;

a fuse block on said oven;

switch means mounted on said oven and positioned adjacent to the rear end of one of said channel members;

conductor means connecting said switch means and said fuse block in series to said components and controls on said control panel; and operator arms on said switch means for selectively engaging said slide and for interrupting the power to said fuse block when said slide is moved from said normal position to said servicing position whereby power is removed from said panel and said panel is in said servicing position.

4. An oven as defined in claim 3 additionally comprising a shelf mounted on the rear of said panel supporting components.

5. An oven as defined in claim 3 additionally comprising a lock means for retaining said panel in a normal position, said snap lock means comprising a first portion mounted on the housing of said oven and a second portion on said slide member, said first and second portions being releasably attached together.

6. An oven as defined in claim 5 wherein mounting means are provided for said first and second portions and wherein said mounting means provides for movement of at least one of said members whereby the members will releasably connect with said panel in various positions.

7. An oven as defined in claim 3 wherein each of said channel members has a horizontally extending slot formed therein, and a removable means extends from said slide and into said slot whereby horizontal movement of said slide is limited by the length of said slot when said removable means is fixed to said slide.

8. An oven as defined in claim 3 wherein said channel members are mounted on top of said oven housing.

* * * * *